United States Patent
Stromberg

(10) Patent No.: US 8,870,503 B2
(45) Date of Patent: Oct. 28, 2014

(54) LOGISTIC HOOK

(71) Applicant: Michael Edwin Stromberg, Reedsburg, WI (US)

(72) Inventor: Michael Edwin Stromberg, Reedsburg, WI (US)

(73) Assignee: Cargo Strategies LLC, Reedsburg, WI (US)

( * ) Notice: Subject to any disclaimer, the term of this patent is extended or adjusted under 35 U.S.C. 154(b) by 0 days.

(21) Appl. No.: 13/782,345

(22) Filed: Mar. 1, 2013

(65) Prior Publication Data

US 2013/0230362 A1 Sep. 5, 2013

Related U.S. Application Data

(60) Provisional application No. 61/605,655, filed on Mar. 1, 2012.

(51) Int. Cl.
*B60P 7/06* (2006.01)

(52) U.S. Cl.
USPC .......................................................... 410/97

(58) Field of Classification Search
USPC .............................. 410/97; D8/367; 24/265 H
See application file for complete search history.

(56) References Cited

U.S. PATENT DOCUMENTS

| | | | | |
|---|---|---|---|---|
| 1,300,078 A * | 4/1919 | Widstrand | .................. | 24/600.9 |
| 2,856,663 A * | 10/1958 | Elsner | ............... | 24/182 |
| 3,430,912 A * | 3/1969 | Davis et al. | .................. | 248/499 |
| 5,285,868 A * | 2/1994 | Amacker | ...................... | 182/134 |
| 5,809,620 A * | 9/1998 | Crowley et al. | ................. | 24/302 |
| 5,832,572 A * | 11/1998 | Norrby | ......................... | 24/600.9 |
| 6,081,975 A * | 7/2000 | Norrby | ......................... | 24/369 |
| D449,221 S * | 10/2001 | Hsieh | ............................ | D8/373 |
| 6,447,033 B1 * | 9/2002 | Konczak | ........................ | 294/15 |
| 6,631,539 B1 * | 10/2003 | Chang | ........................ | 24/599.4 |
| 6,789,384 B2 * | 9/2004 | Hungerford | ..................... | 59/93 |
| 7,081,071 B2 * | 7/2006 | Smith | ......................... | 482/105 |
| 7,311,484 B2 * | 12/2007 | Facey et al. | ................... | 410/100 |
| 7,476,069 B2 * | 1/2009 | Facey et al. | .................. | 410/100 |
| 7,946,005 B2 * | 5/2011 | Lee | ........................... | 24/582.11 |
| 8,070,027 B2 * | 12/2011 | Piatt et al. | .................... | 224/269 |
| 8,172,476 B2 * | 5/2012 | Berney | ......................... | 403/164 |
| 8,434,978 B2 * | 5/2013 | Tardif et al. | ................... | 410/100 |
| 8,454,285 B2 * | 6/2013 | Jackson et al. | ................. | 410/96 |
| 8,459,914 B2 * | 6/2013 | Tatina | ........................ | 410/100 |

* cited by examiner

*Primary Examiner* — H Gutman
(74) *Attorney, Agent, or Firm* — Quarles & Brady LLP

(57) ABSTRACT

A hook for securing cargo includes a body formed by side members and a top member attached thereto. An opening in the body of the hook is defined by the side members and the top member. An extension member protrudes outwardly from a surface of the body. The hook is designed to releasably receive a portion of a strap to secure the strap thereto.

20 Claims, 10 Drawing Sheets

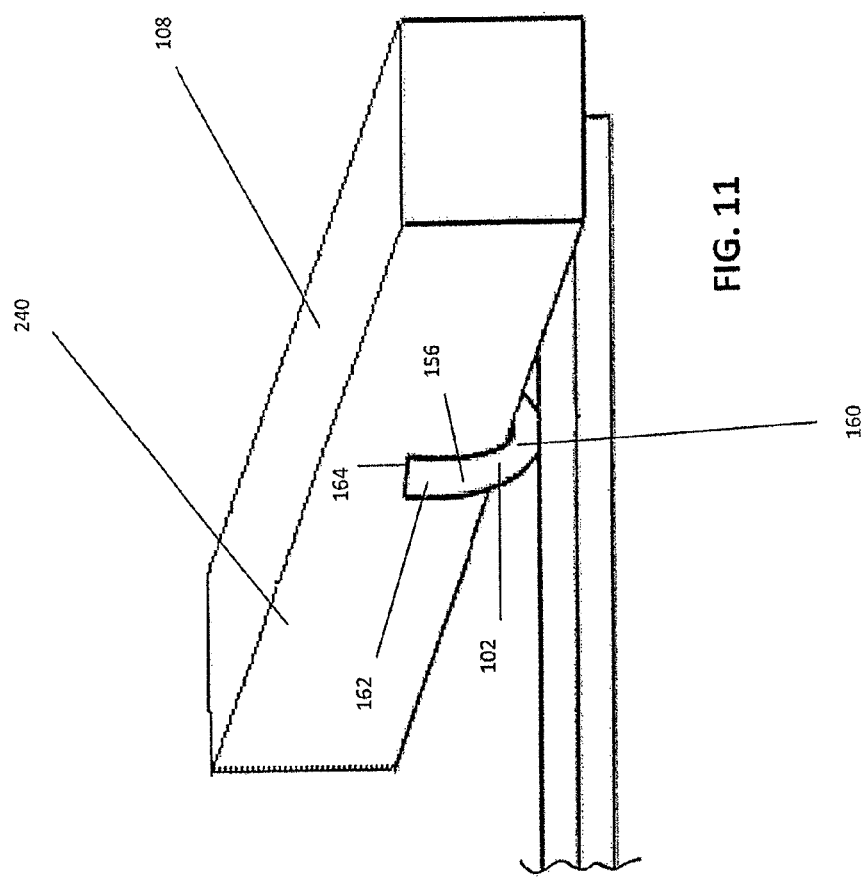

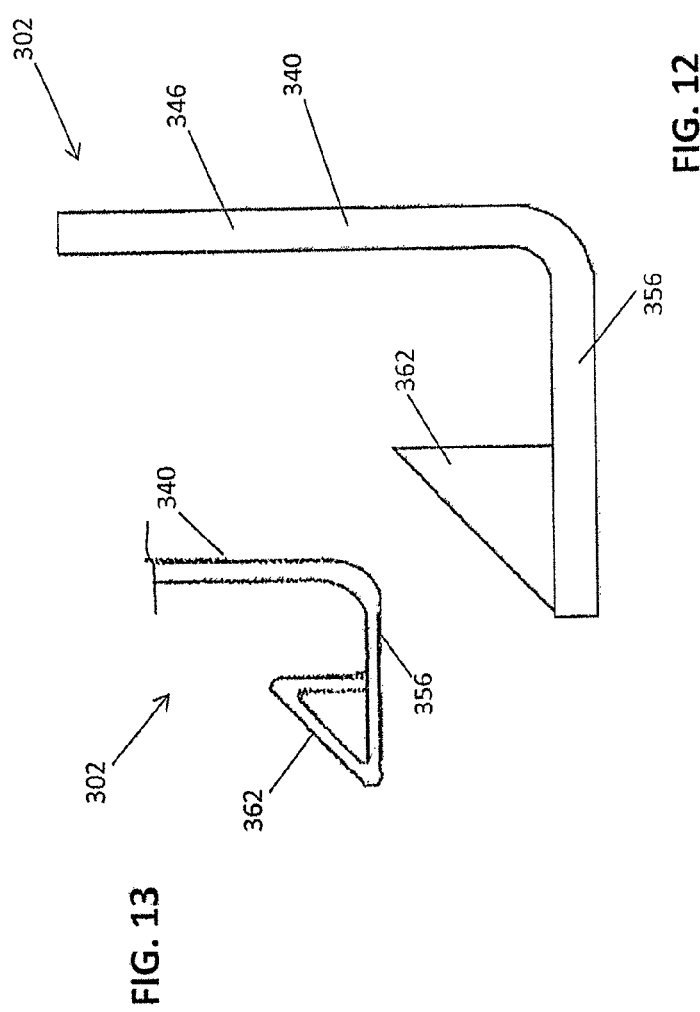

LOGISTIC HOOK

CROSS REFERENCE TO RELATED APPLICATIONS

This application claims the benefit of provisional patent application 61/605,655, filed on Mar. 1, 2012.

REFERENCE REGARDING FEDERALLY SPONSORED RESEARCH OR DEVELOPMENT

Not applicable.

SEQUENCE LISTING

Not applicable.

BACKGROUND OF THE INVENTION

1. Field of the Invention

The present disclosure relates to a method and system of securing freight, and more particularly, to a hook designed to be utilized in conjunction with a strap to secure freight to a pallet.

2. Description of the Background of the Invention

Transportation of goods via pallet or skids requires the goods being secured in some manner such that the goods are not damaged during transport. Otherwise, the pallets or skids can shift and/or tip while in transit, which may cause damage to the freight, cargo, or products being transported. In some instances, the goods are secured using plastic or metal ties. In other instances, the goods are secured using shrink-wrap. However, both of these securement methods require substantial time and energy to secure and unsecure the goods.

A different securement method utilizes logistic straps that are wrapped over and/or around the cargo. Logistic straps typically include a buckle to adjust the length thereof and an end fitting designed to interact with a specific track or other hardware secured to the inside of a truck or box car. Freight, cargo, or other products transported on pallets or skids are especially difficult to secure inside van trailers or box cars, even with logistic straps. One problem of logistic straps is that the straps are not designed to hook to the pallet or skid. Rather the strap must be wrapped over the top or around the product to keep the product and pallet from shifting in transit. Another problem is that end fittings associated with logistic straps are designed to interact only with a specific track or other hardware. If the truck or boxcar lacks the compatible track or hardware, the straps cannot be used properly.

To overcome some of the aforementioned problems, some logistic straps incorporate a hook that is integral with the strap. However, straps having integral hooks cannot be used with separate parts (i.e., a different strap and/or a different hook).

In contrast, the hook disclosed herein overcomes the aforementioned problems by providing a specifically dimensioned hook capable of attaching to a strap and also to the pallet to hold the cargo securely thereto. The hook is removable from the strap and is able to accommodate straps having end fittings of varying size. Additionally, the hooks may be used without strap-specific hardware. Still further, the hook is dimensioned such that it may be used in conjunction with pallets or other devices without lifting the pallets.

SUMMARY OF THE INVENTION

According to one aspect of the present invention, a hook for securing cargo includes a body formed by side members and a top member attached thereto. An opening in the body of the hook is defined by the side members and the top member. An extension member protrudes outwardly from a surface of the body. The hook is designed to releasably receive a portion of a strap to secure the strap thereto.

In a different aspect of the present invention, a securement system comprises a hook defined by a body having an opening extending therethrough and a strap having a fitting at an end thereof. The hook is designed to releasably receive the fitting of the strap through the opening to secure an object to a surface.

In yet another aspect of the present invention, a method of securing cargo to a pallet includes the steps of rotating a strap having a first end with a fitting extending therefrom and inserting the fitting into an opening of a hook. The method further includes the steps of rotating the strap until a portion of the fitting contacts the hook and attaching the hook to the pallet.

BRIEF DESCRIPTION OF THE DRAWINGS

FIG. 11 is a partial isometric view of the hook of FIG. 1 contacting a portion of the pallet while in use;

FIG. 12 is a schematic of a side elevational view of another embodiment of the hook of FIG. 1; and FIG. 13 is a partial schematic side elevational view of another embodiment of the hook of FIG. 1.

Other aspects and advantages of the present invention will become apparent upon consideration of the following detailed description, wherein similar structures have similar reference numerals.

DETAILED DESCRIPTION

Figure 1:
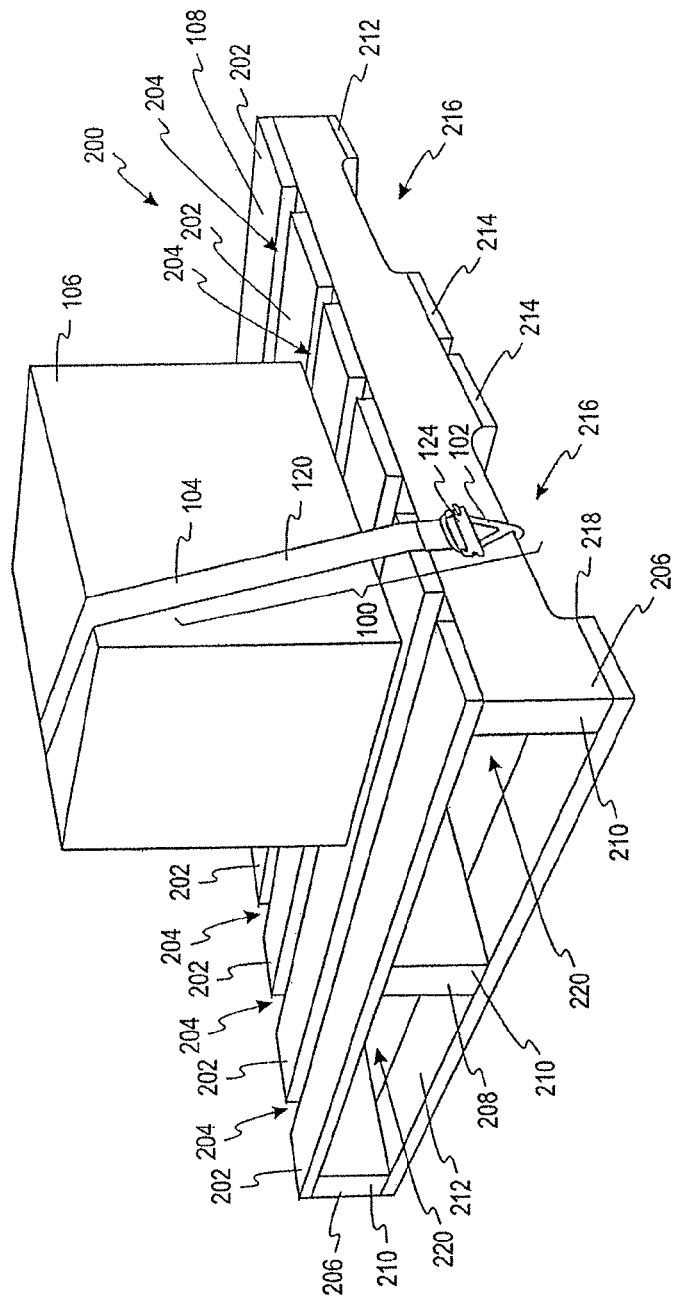
FIG. 1 is schematic view of an embodiment of a securement system including a hook and a strap designed to be utilized with a pallet to secure cargo thereto.

Referring generally to FIGS. 1-13, a securement system 100 includes a hook 102 and a strap 104 adapted to be utilized therewith. The securement system 100 is designed to secure cargo 106 to a pallet 108 or other surface such that the cargo 106 does not shift or tip in transit. The securement system 100 may be used in conjunction with other components (not shown) such as ties or shrink-wrap, or the securement system 100 may be used alone as described herein. The securement system 100 may be sold as a kit, or may be sold as individual parts.

Figure 2:
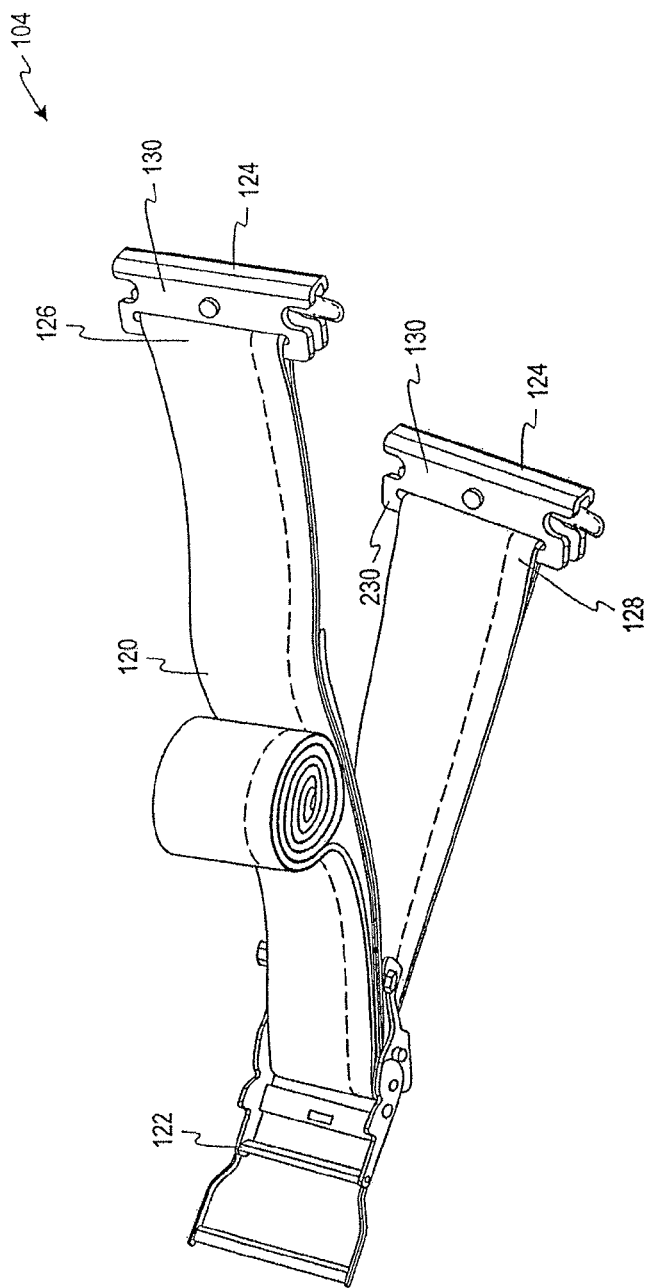
FIG. 2 is an isometric view of the strap of FIG. 1.
Figure 3:
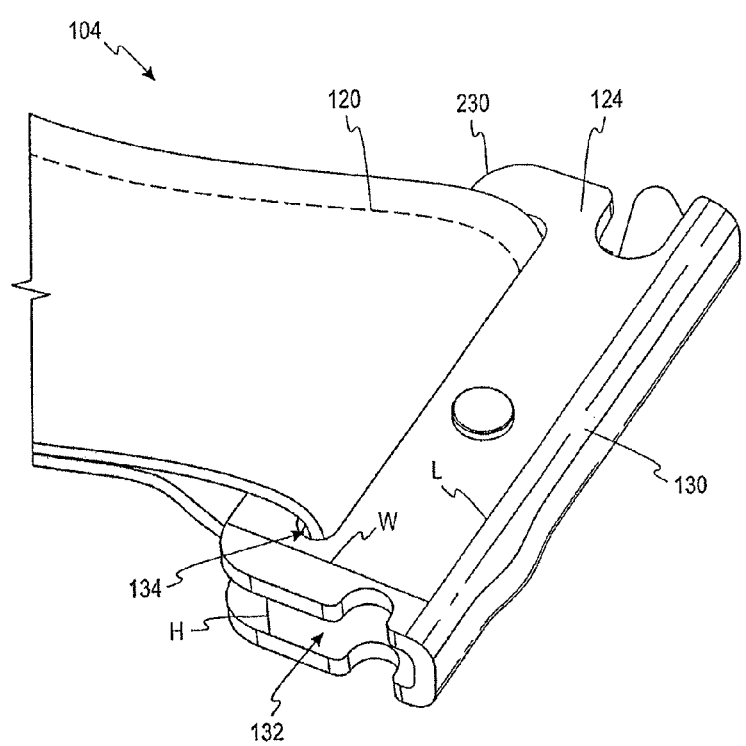
FIG. 3 is an isometric view of a fitting disposed on an end of the strap of FIG. 1, enlarged for clarity.
Figure 4:
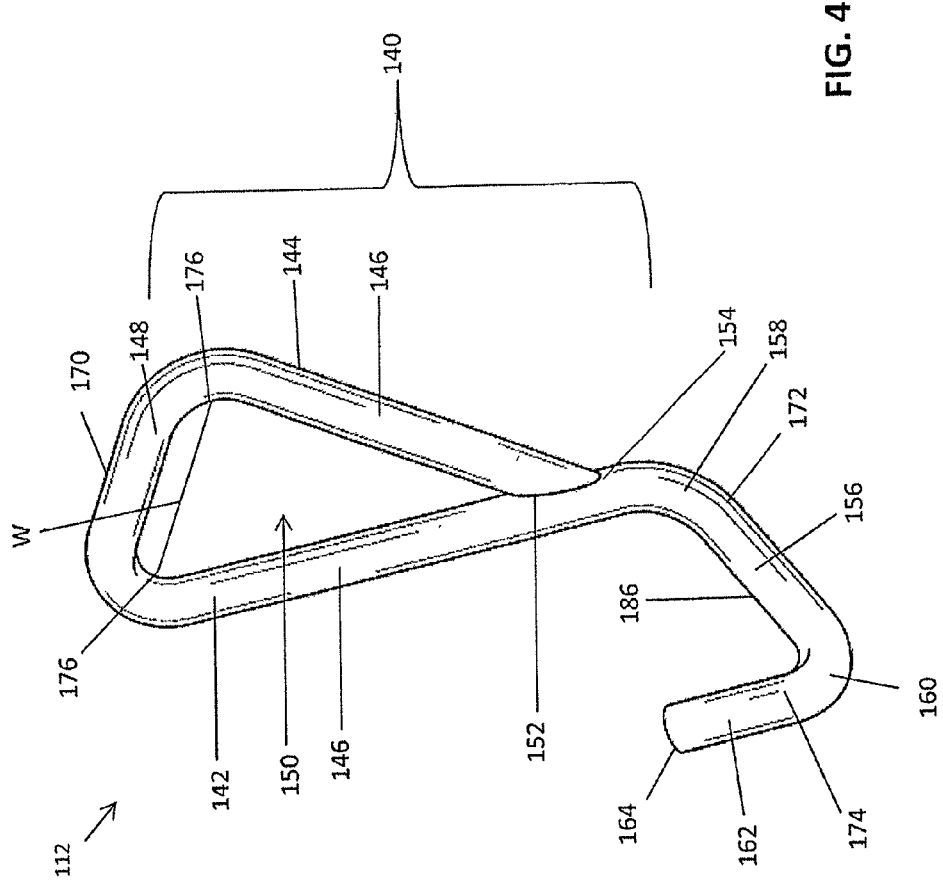
FIG. 4 is an isometric view of the hook of FIG. 1.
Figure 5:
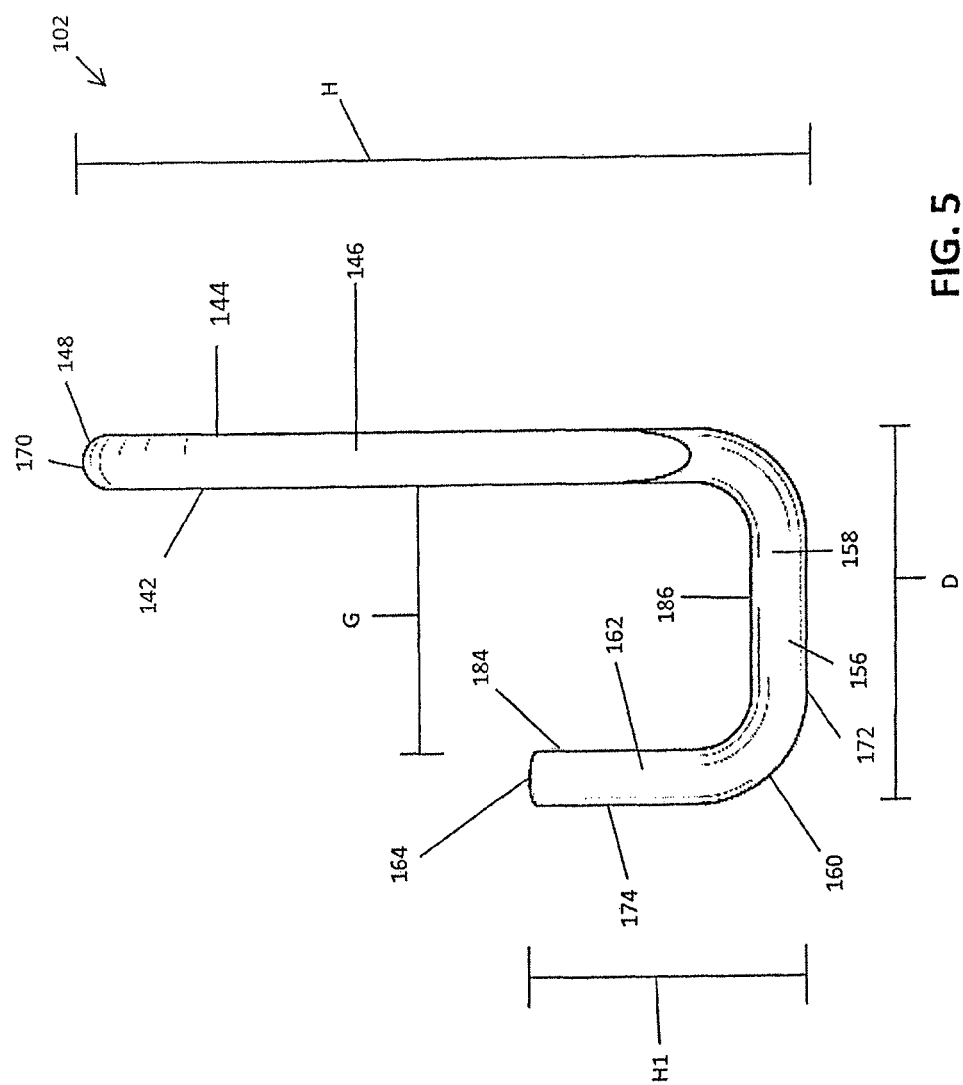
FIG. 5 is a left side elevational view of the hook of FIG. 1.

Now referring to FIGS. 2 and 3, the strap 104 is defined by a flexible strip 120 of material that optionally includes an adjustment mechanism 122 disposed along a portion thereof. In one embodiment, the adjustment mechanism 122 is a buckle or the like that allows the length and/or the tautness of the strip 120 to be adjusted. The strap 104 may include the adjustment mechanism 122 or may comprise a strip 120 having a predetermined length dimension that does not utilize the adjustment mechanism 122. The strip 120 terminates with a fitting 124 at one or more opposing ends 126, 128 thereof.

The strip 120 may be any length and/or width, but is preferably long enough to accommodate cargo 106 having different shapes and/or sizes. The strip 120 may be made of any material, such as, for example, polyester. It should be apparent that the strip 120 may comprise any strip 120, or other similar material/device that is known in the art.

As best seen in FIG. 3, the fittings 124 are each defined by a folded portion 130 having a slot 132 therebetween and forming a substantially rectangular flange. The fittings 124 may further include an opening 134 designed to receive and/or retain a portion of the strip 120. In a one embodiment, the strip 120 is integral with the fitting 124. In a different embodiment, the strip 120 is separate from the fitting 124. The strip 120 may be attached or otherwise connected to the fitting 124 in other manners as known in the art.

In one embodiment, the fitting 124 includes a length dimension L of between about 2.5 in. to about 3 in. (see FIG. 3). In another embodiment, the fitting 124 includes a width dimension W of between about ½ in. to about 2 in. In a different embodiment, the fitting 124 includes a height dimension H of between about ¼ in. to about ¾ in. In one particular embodiment, the fitting 124 includes a length dimension L of about 2.75 in., a width dimension W of about 1⅛ in., and a height dimension H of about ½ in.

The fitting 124 and/or adjustment mechanism 122 is preferably made from a metal material such as steel. In a different embodiment, the fitting 124 and/or adjustment mechanism 122 is made of another material that is strong enough to accommodate a breaking strength of between about 200 lb. to about 2500 lb. It should be apparent that the fittings 124 and/or adjustment mechanism 124 may comprise other materials as known in the art.

Now turning to FIGS. 4-9, the hook 102 includes a substantially triangular body 140 formed by a front surface 142 and a rear surface 144 on an opposing side thereof. The body 140 is formed by two opposing side members 146 and a top member 148, which define an opening 150 therein. The top member 148 is slightly curved and the two opposing side members 146 extend downwardly and inwardly from opposing ends of the top member 148 to intersect at a junction 152 formed at a proximal end 154 of the body 140.

Figure 9:
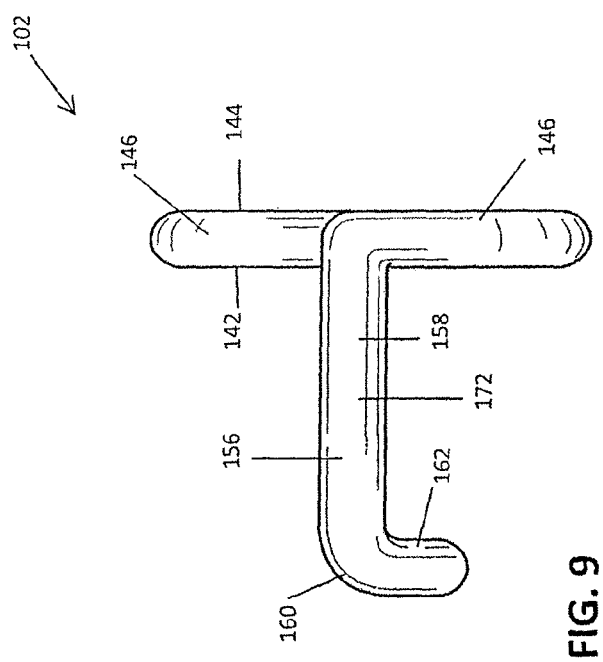
FIG. 9 is a bottom plan view of the hook of FIG. 1.
Figure 8:
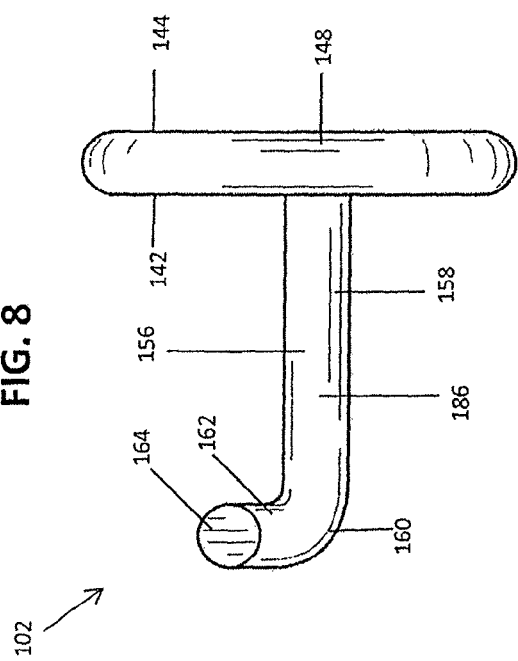
FIG. 8 is top plan view of the hook of FIG. 1.

A substantially J-shaped extension member 156 protrudes outwardly from a point adjacent the junction 152. As best seen in FIGS. 8 and 9, the extension member 156 includes a substantially straight portion 158 that is integral with a rounded corner portion 160. The straight portion 158 protrudes from the body 140 in a substantially perpendicular manner. The rounded corner portion 160 includes an end piece 162 that extends upwardly with respect to the straight portion 158 and terminates at a point 164 at an end thereof.

Figure 6:
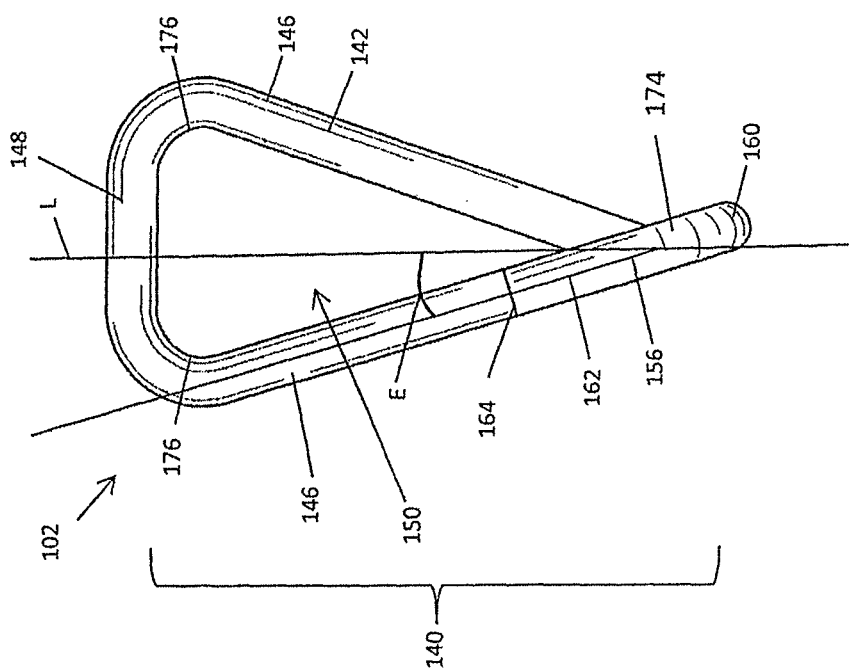
FIG. 6 is a front elevational view of the hook of FIG. 1.

As shown in FIG. 6, the end piece 162 extends upwardly in an angled manner. In one embodiment, the end piece 162 is in the same plane as one of the side members 146 of the body 140 of the hook 102. In a different embodiment, the end piece 162 is in a plane adjacent one of the side members 146. In particular, the end piece 162 forms an angle E with respect to a longitudinal axis L of the body 140 of the hook 102. In one embodiment, the angle E is between about 5 degrees to about 85 degrees. In a different embodiment, the angle E is between about 10 degrees to about 60 degrees. In another embodiment, the angle E is between about 15 degrees to about 30 degrees. In one specific embodiment, the angle E is about 20 degrees.

The hook 102 is preferably made from a metal material, such as, for example, high tensile steel. In one particular embodiment, the high tensile steel is AISI 1038. In a different embodiment, the hook 102 is made of other materials such as cold rolled steel, aluminum, composites, cast iron, carbon fiber, and the like. Other types of materials may be utilized as well including carbon steel. It should be apparent that the hook 102 may comprise other materials as known in the art so long as the hook 102 comprises sufficient strength to maintain its form and not deform during transit or while in use.

The hook 102 is preferably formed using a metal rod having a diameter of between about 0.1 in. to about 1 in. In a different embodiment, the metal rod has a diameter of between about 0.2 in. to about 0.75 in. In still a further embodiment, the metal rod has a diameter of between about 0.25 in. to about 0.5 in. In a particular embodiment, the diameter of the rod is about ⅜ in. In another embodiment, the diameter of the rod is about 0.25 in. In a further embodiment, the diameter of the rod is about 0.5. It should be appreciated that the diameter dimension of the metal rod may be adjusted as desired.

The hook 102 is preferably characterized by dimensions appropriate for utilization of the hook 102 in conjunction with the strap 104 and pallet 108. For example, in one embodiment, the body 140 of the hook 102 includes a height dimension H of between about 2 in. to about 8 in. (see FIG. 5), as measured from a top surface 170 of the top member 148 to a bottom surface 172 of the extension member 156. In another embodiment, the height dimension H is between about 4 in. to about 6 in. In one particular embodiment, the height dimension H is about 6 in. In another embodiment, the height dimension H is about 4.5 in. In one embodiment, the hook 102 includes a depth dimension D of between about 1 in. to about 6 in., as measured from the rear surface 144 of the body 140 to a front surface 174 of the end piece 162. In a different embodiment, the depth dimension D is between about 2 in. to about 4 in. In one particular embodiment, the depth dimension D is about 2.5 in. In a different embodiment, the depth dimension D is about 4 in. In a further embodiment, the depth dimension D is about 3 in. In one embodiment, the hook 102 includes a width dimension W (see FIG. 4) of between about 1 in. to about 4 in., as measured from internal surfaces 176 of the opposing side members 146 at a location adjacent the top member 148. In another embodiment, the width dimension W is between about 1 in. to about 2 in. In one particular embodiment, the width dimension W is about 1.75 in.

In one specific embodiment, the hook 102 has a height dimension H of about 4.6 in., a depth dimension of about 2.5 in., and a width dimension of about 1.75 in. In another embodiment, the hook 102 has a height dimension H of about 4.6 in., a depth dimension of about 3.25 in., and a width dimension of about 1.75 in. In a further embodiment, the hook 102 has a height dimension H of about 4.6 in., a depth dimension of about 2.5 in., and a width dimension of about 1.75 in.

Figure 7:
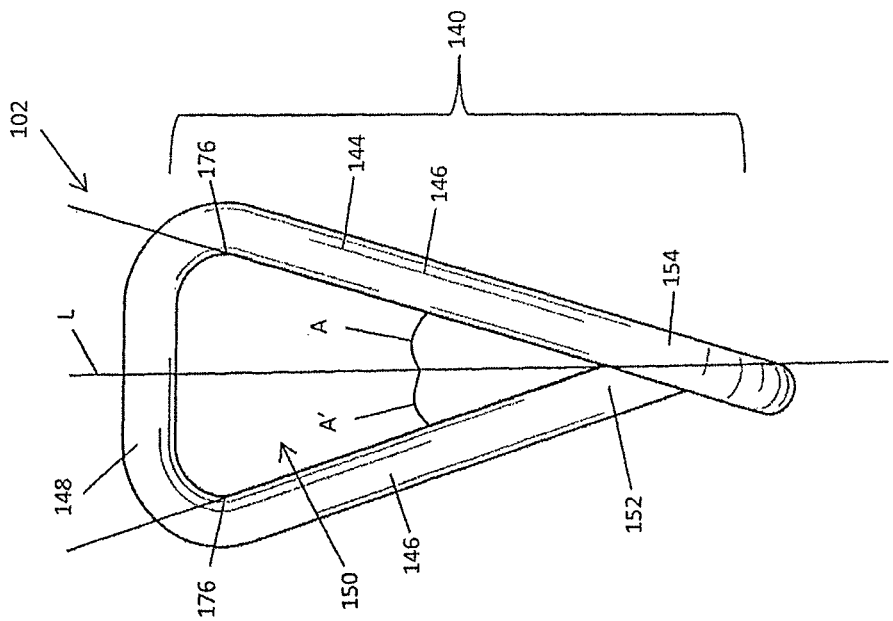
FIG. 7 is a rear elevational view of the hook of FIG. 1.

As best seen in FIG. 7, the side members 146 of the hook 102 form angles A and A' with respect to a longitudinal axis L that extends through the junction 152. In one embodiment, the angles A and A' are substantially equal to each other. In a different embodiment, the angles A and A' are different with respect to each other. The angles A and A' are between about 5 degrees to about 85 degrees. In a different embodiment, the angles A and A' are between about 10 degrees to about 60 degrees. In another embodiment, the angles A and A' are between about 15 degrees to about 30 degrees. In one specific embodiment, the angles A and A' are about 20 degrees. It should be appreciated that the angles A and A' may be the same as angle E (shown in FIG. 6) in one embodiment. In a different embodiment, the angles A and A' are different from the angle E.

Referring again to FIG. 5, the end piece 162 of the extension member 156 preferably includes a height dimension $H_1$ of between about 0.5 in. to about 4 in., as measured from the bottom surface 172 of the extension member 156 to an upper surface 180 of the point 164. In another embodiment, the height dimension $H_1$ is between about 1 in. to about 2 in. In one specific embodiment, the height dimension $H_1$ is about 1.3 in.

In one embodiment, the ratio of the height dimension H to $H_1$ is preferably about 4 to about 1. In a different embodiment, the ratio of the height dimension H to $H_1$ is preferably about 3 to about 1. In a further embodiment, the ratio of the height dimension H to $H_1$ is preferably about 2 to about 1. The height dimensions H and $H_1$ may also be adjusted based on other considerations as discussed in more detail hereinbelow.

A gap G is formed between the front surface 142 of the body 140 and an interior surface 184 of the end piece 162. A portion of the pallet 108 is designed to rest on an upper surface 186 of the extension member 156 and to be disposed at least partially within the gap G. In one embodiment, the gap G is between about 0.5 in. to about 4 in. In a different embodiment, the gap G is between about 1 in. to about 3 in. In a further embodiment, the gap G is between about 1.5 in. to about 3.25 in. In one particular embodiment, the gap G is about 1.8 in. In another embodiment, the gap G is about 3.25 in.

The securement system 100 is designed to be used with a surface adapted to support objects or cargo 106. In one embodiment, the surface is a shipping container. In a different embodiment, the surface is a crate. In a further embodiment, the surface is a pallet 108 or skid. The surface is preferably substantially flat and optionally includes vertical walls (not shown) extending upwardly therefrom. The flat surface may be one unitary structure, or may comprise a plurality of segments that are connected to form the surface.

As best seen in FIG. 1, a typical pallet 108 includes a top deckboard 200 formed by a plurality of boards 202 that extend in parallel with respect to each other and are provided with spaces 204 therebetween. The top deckboard 200 is supported by end runners 206 disposed on opposing sides thereof and a middle support runner 208. Ends 210 of the runners 206, 208 are supported by bottom deckboards 212 at opposing ends thereof and two middle deckboards 214. The top deckboard 200 and the bottom deckboard 212 are substantially aligned with one another, whereas the runners 206, 208 each extend in a direction substantially perpendicular to the top and bottom deckboards 200, 212 respectively. Two elongate curved slots 216 are provided adjacent a bottom edge 218 of each of the end runners 206. Openings 220 are defined by the space between the top deckboard 200 and the bottom deckboard 212.

Although one specific pallet 108 is depicted in FIG. 1, it should be appreciated that other types of pallets may be used with the securement system 100 described herein. Types of pallets that may be utilized include two-way pallets, partial four-way pallets, and four-way pallets. Further, the pallet may include a flush deckboard, a single wing deckboard, or a double wing deckboard. Still further, the pallet may be a stringer style, a block style, or a skid style, as known in the art. Although various types of pallets are described herein, any pallet or other surface may be used to secure cargo 106 as described herein.

In use, the hook 102 is designed to attach to the strap 104 and a portion of the pallet 108 to secure the cargo 106 thereto. In one particular embodiment, the hook 102 is designed to interact with a bottom portion of the pallet 108, for example, through slot 216. After the strap 104 is wrapped over the cargo 106 in the manner desired, the fitting 124 is positioned adjacent the front surface 142 of the hook 102 and is rotated such that the fitting 124 can extend through the opening 150 therein. After the fitting 124 is positioned adjacent the rear surface 144 of the hook 102, the fitting 124 is then rotated back to its original position such that an exterior edge 230 of the fitting catches on the rear surface 144 of the hook 102.

Once the fitting 124 contacts the rear surface 144 of the hook 102, the hook 102 may be interlocked with the pallet 108 as described. The hook 102 is preferably rotated such that the point 164 of the extension member 156 is adjacent the slot 216. In one embodiment, the hook 102 is rotated about 45 degrees. In another embodiment, the hook 102 is rotated about 60 degrees. In a different embodiment, the hook 102 is rotated such that one of the side members 146 of the body 140 is disposed adjacent a horizontal surface (e.g., a floor) that the pallet 108 is being supported thereby. It should be appreciated that, depending on the size of the slot or opening, the hook 102 may not need to be rotated at all. Conversely, the hook 102 may need to be rotated in a different manner and/or a different amount than described herein.

Figure 10:
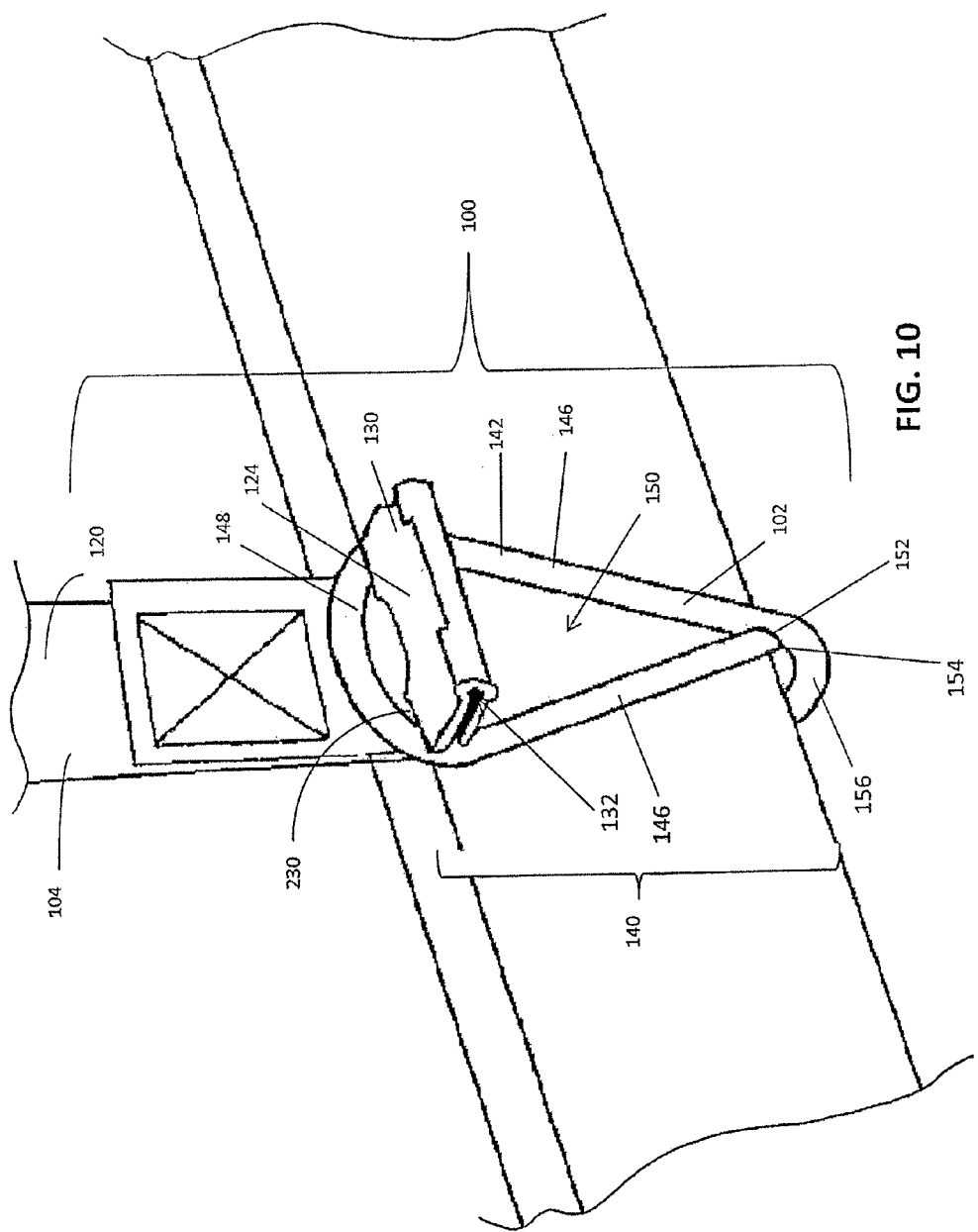
FIG. 10 is a partial isometric view of the securement system of FIG. 1 in use, enlarged for clarity.

Once the point 164 of the extension member 156 of the hook 102 is positioned appropriately, the hook 102 may be slid into the slot 216 or otherwise positioned adjacent an internal surface 240 of the pallet 108, as shown in FIGS. 10 and 11. After sliding, in one embodiment, the hook 102 is rotated into a substantially upright position to ensure the extension member 156 of the hook 102 is contacting the internal surface 240 in a manner that secures the cargo 106 in an appropriate manner. In a different embodiment, the side member 146 of the hook 102 is positioned adjacent a horizontal surface that the pallet 108 is supported by. A portion of the hook 102 (e.g., the end piece 162) can be slid under a portion of the pallet 108 (e.g., the runner) before the hook 102 is rotated into contact with an internal portion of the pallet 108. In another embodiment, the hook 102 may not need to be rotated, but rather is directly positioned adjacent the internal surface 240 as depicted in FIG. 11. After at least a portion of the extension member 146 is disposed on an internal portion of the pallet 108, the strap 104 may be tightened using the adjustment mechanism 122.

One unique aspect of the securement system 100 described herein, and more particularly, with respect to the hook 102, is that the hook 102 is designed to slide under portions of the pallet 108 while the pallet 108 is resting on a horizontal surface. The pallet 108 need not be moved, raised, or otherwise lifted in order to securely attach the hook 102 thereto. The dimensions of the hook 102 are preferably selected such that the hook 102 may be slid under pallets 108 having various dimensions and/or slots. In one embodiment, the securement system 100 may be utilized with a pallet 108 that does not incorporate any slots or openings on a side thereof (contrasted with the normal clearance provided under the pallet).

It should be appreciated that the hook 102 may be positioned prior to interlocking the hook 102 to the strap 104. Alternatively, the hook 102 and strap 104 may be interlocked first, and then positioned on the pallet 108.

A different embodiment of a hook 302 is depicted in FIGS. 12 and 13. The hook 302 is similar to the hook 102 described previously herein except for the differences noted below. In particular, the hook 302 includes a body 340 and an extension member 356 protruding outwardly therefrom. The extension member 356 includes an angled gusset 362 disposed at an end thereof instead of the end piece 162 depicted in FIGS. 4-9. The gusset 362 may be aligned and extend outwardly from the body 340 of the hook 302 in the same plane as one of the side members 346. The gusset 362 may comprise a solid material as shown on FIG. 12, or may comprise a member having an opening therein as depicted in FIG. 13. In one embodiment, the gusset 362 is formed from a metal rod having a diameter dimension between about 0.25 in. to about 0.5 in.

The hook 302 may be used by itself or may optionally include a pin (not shown). The pin is formed of a metal rod having a diameter dimension between about 0.25 in. to about 0.5 in. To form the pin, the metal rod is bent on an end thereof to form a circular shape with an opening therethrough. The pin is adapted to slide over the hook 302 and preferably includes a length dimension that allows the pin to extend across the width of the hook 302.

In use, the hook 302 may be positioned in a manner whereby the gusset 362 is disposed away from a person holding the hook 302. The pin is then disposed in an upward direction and slid into a strap (not shown) over the pin. The pin may then be slid through the hook 302 and rotated to attach the strap thereto. The hook 302 and pin with the strap attached thereto may then be utilized in manners as described herein.

Any of the hooks described herein are designed to secure an end of a strap to the bottom of a pallet or skid to secure the freight, cargo, or product thereto. The securement system 100 may also be used to secure the pallet or skid inside a trailer during transit. Further, the hooks can be used in warehouses or outside to secure tall freight to pallets or skids from tipping. The hooks may also be used to secure freight or cargo or product to pallets or skids on other type of vehicles such as flatbeds trailers or pickup trucks.

It should be appreciated that all of the measurements disclosed herein are approximate figures. In particular, the shape contemplated by the hook includes rounded portions whereby the measurement is taken from a radius that extends furthest from the center point.

Any of the embodiments described herein may be modified to include any of the structures or methodologies disclosed in connection with different embodiments. Further, the present disclosure is not limited to the straps of the type specifically shown. For example, the straps 104 may have other shapes, sizes, and/or fittings. Similarly, it is contemplated that the hook and/or strap may be utilized to attach an object to a surface. The surface may be any surface consistent with the disclosure herein.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

I claim:

1. A hook for securing cargo, comprising:
    a body formed by a first and a second side member and a top member attached thereto;
    an opening in the body of the hook defined by the first and second side members and the top member; and
    an extension member that protrudes outwardly from a surface of the body and is provided in the same plane as the first side member,
    wherein the hook is designed to releasably receive a portion of a strap to secure the strap; and
    wherein the opening has a height measured along a longitudinal axis that is greater than a width measured at the top member.

2. The hook of claim 1, wherein the portion of the strap extends through the opening in the body.

3. The hook of claim 1, wherein the body is defined by a front surface and a rear surface.

4. The hook of claim 2, wherein the portion of the strap contacts the rear surface of the hook during use.

5. The hook of claim 1, wherein the hook is sized to slide under a pallet having a clearance of about 0.5 in with respect to a surface.

6. The hook of claim 1, wherein the first side member and the extension member each form an angle of about 20 degrees with respect to a longitudinal axis of the hook.

7. The hook of claim 1, wherein the hook includes a height dimension of about 4.6 in., a depth dimension of about 2.5 in., and a width dimension of about 1.75 in.

8. A hook for securing cargo, comprising:
    a body formed by a first and a second side member and a top member attached thereto, the first and second side member intersecting at a junction;
    an opening in the body of the hook defined by the first and second side members and the top member; and
    an extension member that protrudes outwardly from a surface of the body and is angled with respect to a longitudinal plane that is perpendicular to a plane defined by the body, the longitudinal plane passing through the junction.

9. The hook of claim 8, wherein the extension member is oriented parallel to the first side member.

10. The hook of claim 8, wherein the extension member is substantially J-shaped.

11. The hook of claim 8, wherein the extension member is defined by a substantially straight portion that includes a rounded corner portion.

12. The hook of claim 8, wherein the first side member forms an angle of about 20 degrees with respect to the longitudinal axis of the hook.

13. The hook of claim 12, wherein the extension member forms an angle of about 20 degrees with respect to the longitudinal axis of the hook.

14. The hook of claim 13, wherein the first side member and the extension member form substantially the same angle with respect to the longitudinal axis of the hook.

15. A hook, comprising:
    a body formed by a first and a second side member and a top member in communication with the first and second side members;
    an opening in the body of the hook defined by the first and second side members and the top member; and
    an extension member that protrudes outwardly from the body and is offset with respect to a central longitudinal plane that is perpendicular to a plane defined by the hook body;
    wherein the extension member crosses the central longitudinal plane.

16. The hook of claim 15, wherein the body of the hook is provided in a substantially triangular manner.

17. The hook of claim 15, wherein the extension member is formed by a single metal rod.

18. The hook of claim 15, wherein the extension member is provided as a metal material.

19. The hook of claim 15, wherein the first and second side members form angles with respect to the longitudinal axis that are substantially equal to each other.

20. The hook of claim 19, wherein the angle formed by the first side member with respect to the longitudinal axis is substantially the same as an angle formed by the extension member with respect to the longitudinal axis.

* * * * *